(12) United States Patent
Baych et al.

(10) Patent No.: US 9,815,715 B2
(45) Date of Patent: Nov. 14, 2017

(54) SYSTEM AND METHOD FOR DESALINATION

(71) Applicant: LADi Water, LLC, Waconia, MN (US)

(72) Inventors: Ken Baych, Chaska, MN (US); Danney Winkelman, Waconia, MN (US)

(73) Assignee: LADI WATER, LLC, Waconia, MN (US)

( * ) Notice: Subject to any disclaimer, the term of this patent is extended or adjusted under 35 U.S.C. 154(b) by 272 days.

(21) Appl. No.: 14/701,932

(22) Filed: May 1, 2015

(65) Prior Publication Data

US 2015/0315041 A1 Nov. 5, 2015

Related U.S. Application Data

(60) Provisional application No. 61/987,011, filed on May 1, 2014.

(51) Int. Cl.
| | |
|---|---|
| *C02F 1/461* | (2006.01) |
| *C02F 1/46* | (2006.01) |
| *C02F 1/469* | (2006.01) |
| *C02F 101/10* | (2006.01) |
| *C02F 103/08* | (2006.01) |

(52) U.S. Cl.
CPC .......... *C02F 1/4691* (2013.01); *C02F 1/4604* (2013.01); *C02F 1/46104* (2013.01); *C02F 2001/46152* (2013.01); *C02F 2101/10* (2013.01); *C02F 2103/08* (2013.01); *C02F 2201/46* (2013.01); *C02F 2209/05* (2013.01)

(58) Field of Classification Search
CPC .............................. C02F 1/4604; C02F 1/4691
See application file for complete search history.

(56) References Cited

U.S. PATENT DOCUMENTS

| | | |
|---|---|---|
| 3,354,068 A | 11/1967 | Rightmire et al. |
| 4,008,135 A | 2/1977 | Gazda |
| 4,948,514 A | 8/1990 | MacGregor et al. |
| 5,124,012 A | 6/1992 | Berleyev |
| 6,325,907 B1 | 12/2001 | Andelman |
| 6,783,687 B2 | 8/2004 | Richard |
| 6,795,298 B2 | 9/2004 | Shiue et al. |
| 7,033,478 B2 | 4/2006 | Harde |
| 7,981,268 B2 | 7/2011 | Bourcier et al. |
| 8,377,280 B2 | 2/2013 | Johnson |
| 8,377,297 B2 | 2/2013 | Kippeny et al. |
| 8,404,093 B2 | 3/2013 | Volkel et al. |
| 8,460,532 B2 | 6/2013 | Bourcier et al. |
| 2004/0007452 A1 | 1/2004 | Warren et al. |
| 2007/0158185 A1* | 7/2007 | Andelman ............ C02F 1/4691 204/229.7 |
| 2008/0023333 A1* | 1/2008 | Johnson ................ C02F 1/4691 204/554 |
| 2012/0247959 A1 | 10/2012 | Seed et al. |

* cited by examiner

*Primary Examiner* — Brian W Cohen
(74) *Attorney, Agent, or Firm* — Fredrikson & Byron, P.A.

(57) ABSTRACT

A system and method of desalination that utilizes a channel formed by a series of opposed rails where the series of opposed rails determines the length of the channel and the distance between opposed rails determines the width of the channel. Non-adjacent rails along the length of the channel are electrically coupled in a pattern and they are sequentially energized to create a potential voltage between opposed pairs of rails that attract ions towards them when ionized water flows through the channel.

15 Claims, 11 Drawing Sheets

WATER FLOW

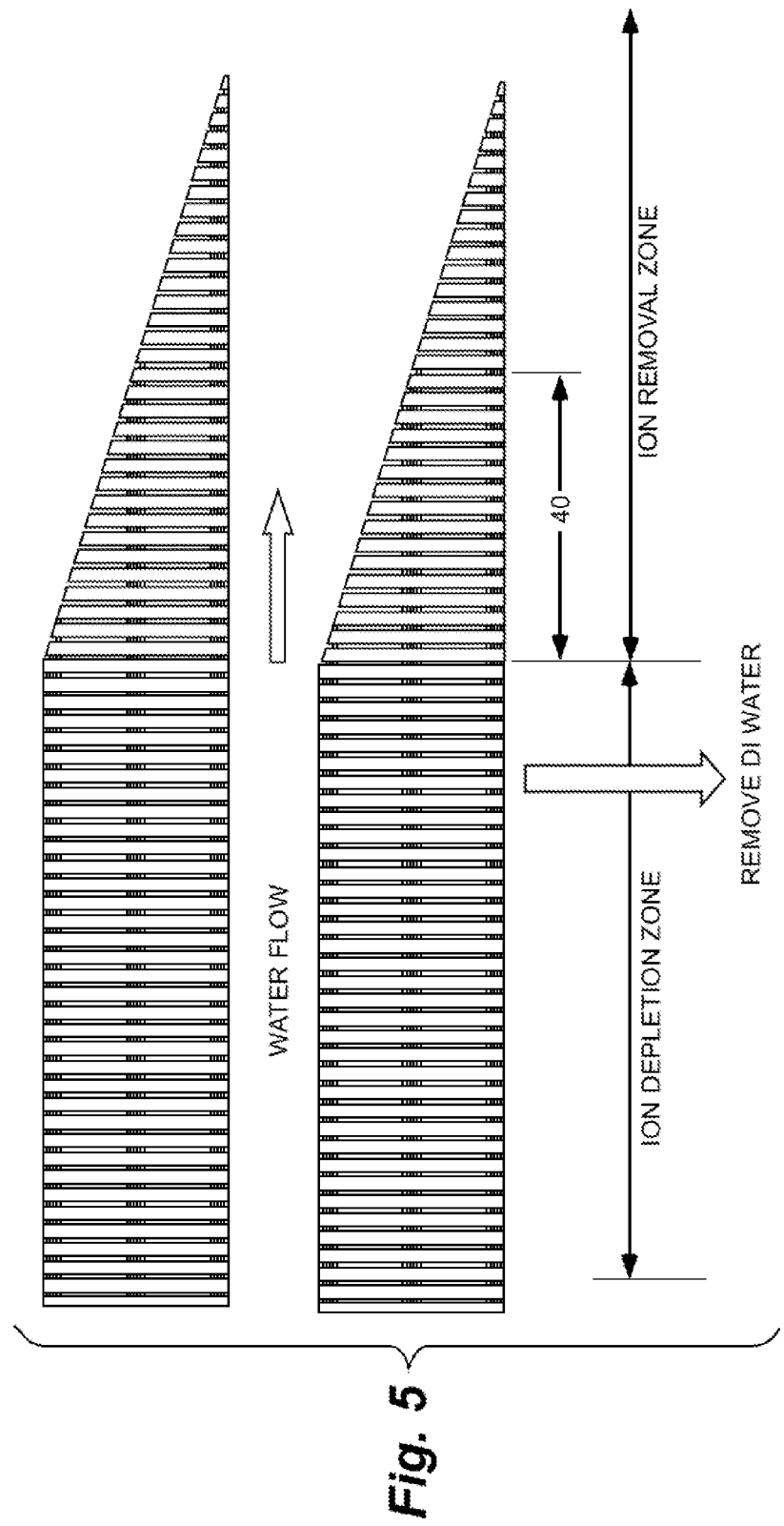

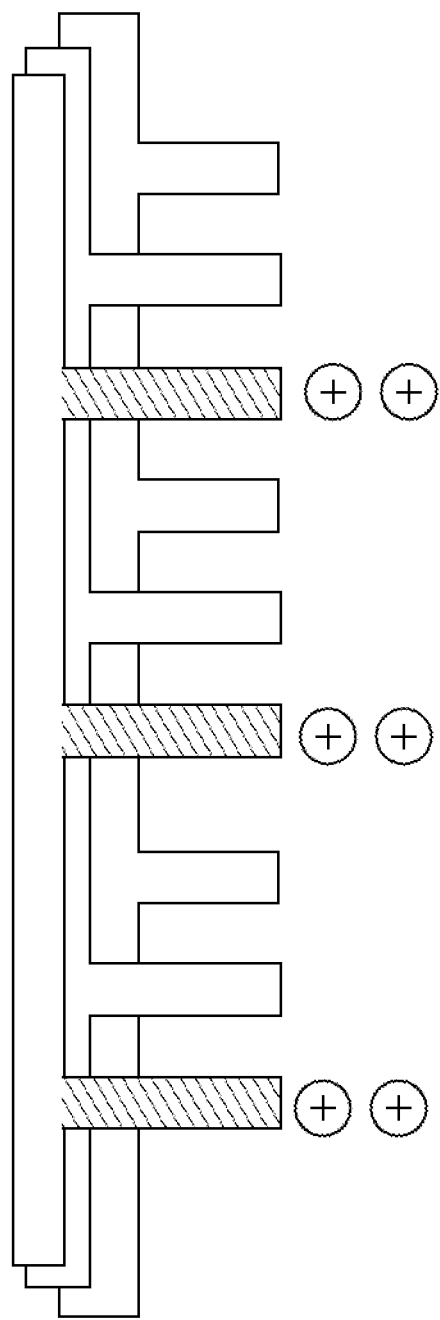

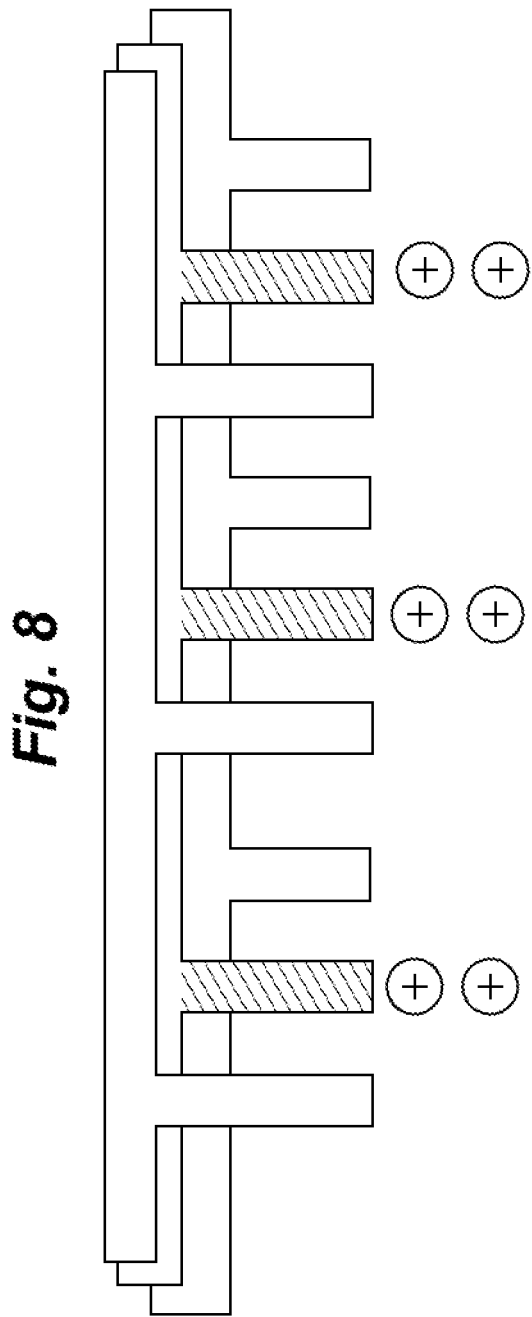

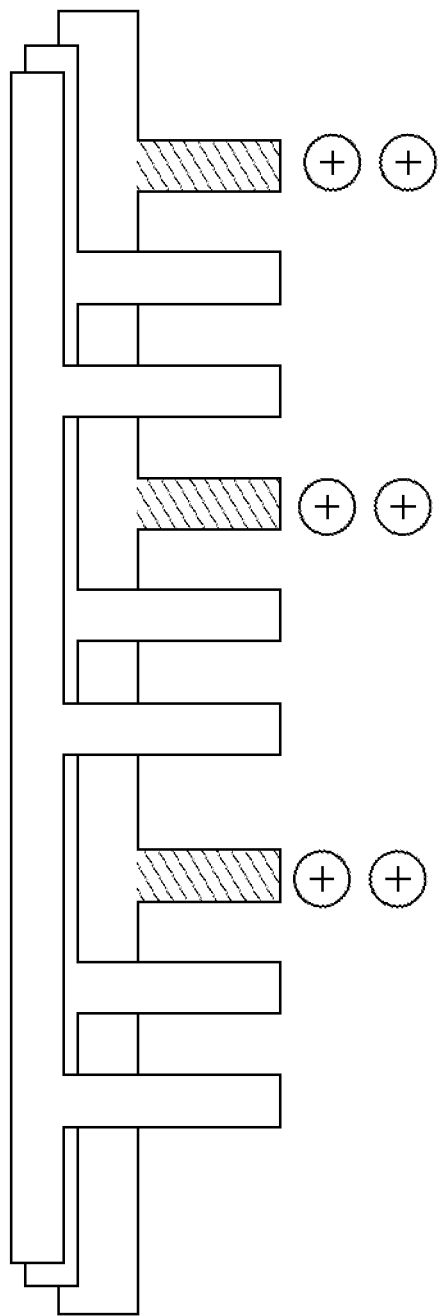

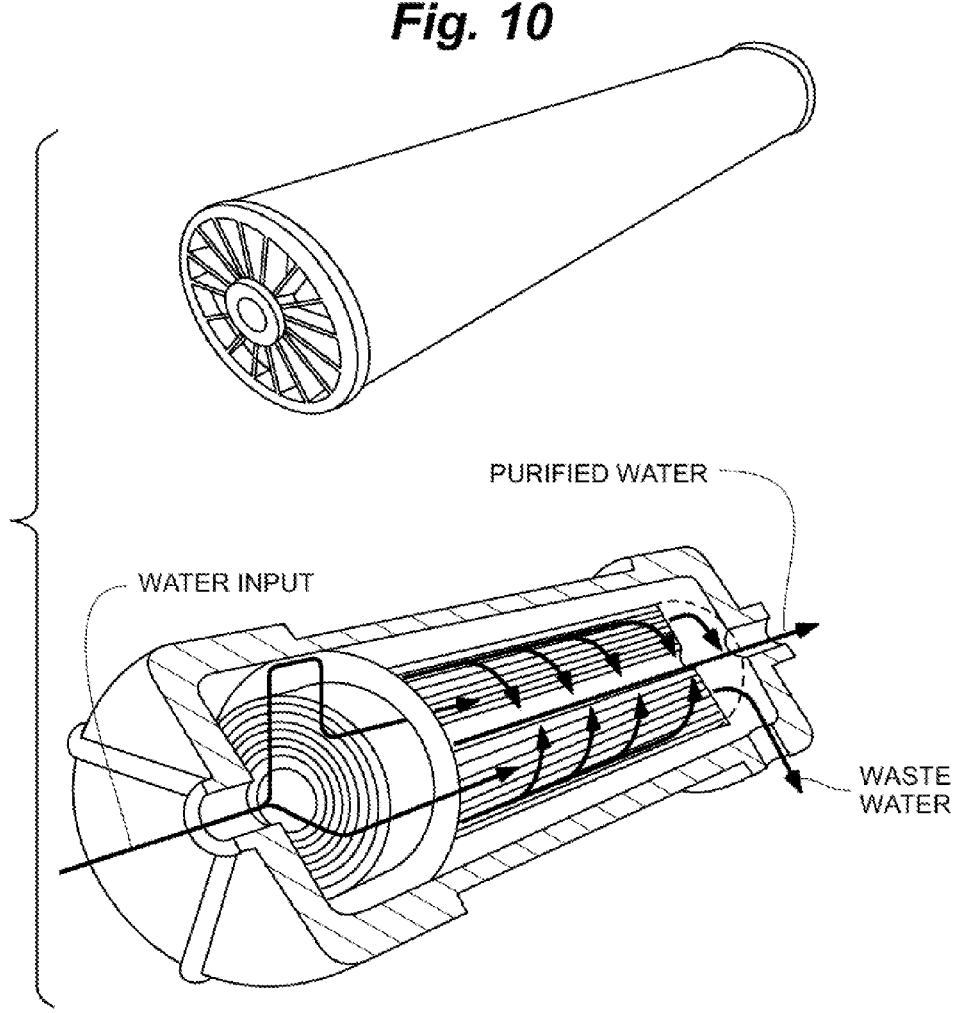

SYSTEM AND METHOD FOR DESALINATION

CROSS-REFERENCE TO RELATED APPLICATIONS

This application claims the benefit of U.S. Provisional Application No. 61/987,011 filed May 1, 2014.

FIELD OF THE INVENTION

The embodiments of the invention relate to an apparatus and method of desalination of water by removing ions, and, more particularly, an apparatus and method that utilizes charged surfaces to sorb ions from salt solutions.

BACKGROUND

Water contaminated with salts over 1,000 parts per million (ppm) is not fit for human consumption. There are many known processes for separating ions and other dissolved solids from water but most of them require large amounts of energy and extensive knowledge to operate. Examples include distillation, reverse osmosis, ion exchange and electrodialysis.

Capacitive deionization is another process used to separate ions from an ionic fluid. This method typically employs two electrodes with spaced-apart end plates in a cell. As the ionic fluid enters the cell, it flows through a channel defined by the electrodes, substantially parallel to the electrodes. By polarizing the cell by energizing the electrodes, ions are removed from the ionic fluid and are held on the surface of the electrodes. Once the cell is saturated with the removed ions, the cell is regenerated by discharging the electrodes and releasing the ions held at the electrodes. In a typical setup, an output pipe is closed with a valve prior to regeneration and the flow is redirected to an alternate waste conduit. Once a sufficient amount of ions are released, the system is deemed to be regenerated. At that point the operator can recommence the deionization process by closing the valve to the waste conduit, recharging the electrodes, and reopening the valve to the output pipe.

Through the use of microscale technology, capacitive deionization can be applied to reduce energy concerns and implement such systems on a more large-scale basis. Electric fields are effective at pulling charged particles through a medium over short distances, and microtechnology allows for these small distances to be used in conjunction with electric fields to efficiently remove ions from water and produce a clean flow of water that can be collected for subsequent use. Since an electric field is produced by a voltage gradient, it is possible to create high voltage potentials without requiring large currents which results in a low power usage.

BRIEF DESCRIPTION OF THE DRAWINGS

FIG. 5 is a schematic of an ion removal zone of the flexible circuit shown in FIG. 3.

FIGS. 7-9 are schematic illustrating the movement along one side of the channel in response to the sequential activation of the rails.

FIG. 10 is a representation of a desalination member formed in a cylindrical shape.

DETAILED DESCRIPTION OF THE DRAWINGS

Figure 1:
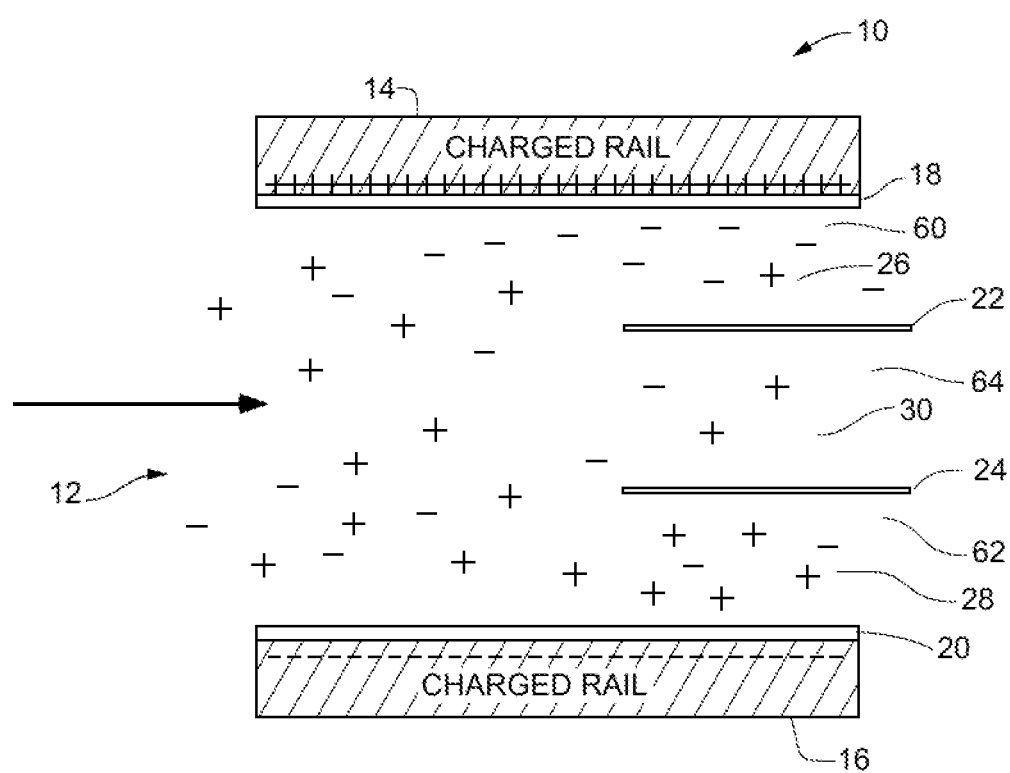
FIG. 1 is a schematic representation of a flow of fluid having ions past two charged plates to illustrate the basis of operation of the embodiments of the invention.

FIG. 1 is a schematic representation of a flow of fluid having ions past two charged plates to illustrate the basis of operation of the embodiments of the invention.

Only two opposed rails 14 and 16, i.e. charge collection surfaces, are illustrated. As will be described with the respect to other drawings, the embodiments of the present invention utilize a series of opposed rails to form a channel through which the water flows and the series of rails are sequentially energized to drive the ions along the channel faster than the flow of the water through the channel.

The fluid to be deionized flows through the channel past the two rails. The rails are electrodes with electrode 14 positively charged and electrode 16 negatively charged to create a potential difference therebetween. The positively charged electrode 14 attracts negative ions toward the upper portion of the channel towards electrode 14 and the negatively charged electrode 16 attracts the positive ions toward the bottom portion of the channel towards electrode 16. Preferably, each electrode 14, 16 is charged respectively to 150 volts thereby creating a potential voltage of 300 volts therebetween. Of course, other voltage levels may be used.

The charged electrodes 14, 16 are isolated from the fluid stream by nonconductive, impermeable barriers which insulate the electrodes from the fluid thereby preventing arcing and protecting the electrodes from fouling by the ions. Preferably, the barriers are waterproof and are dielectrics.

Figure 2:
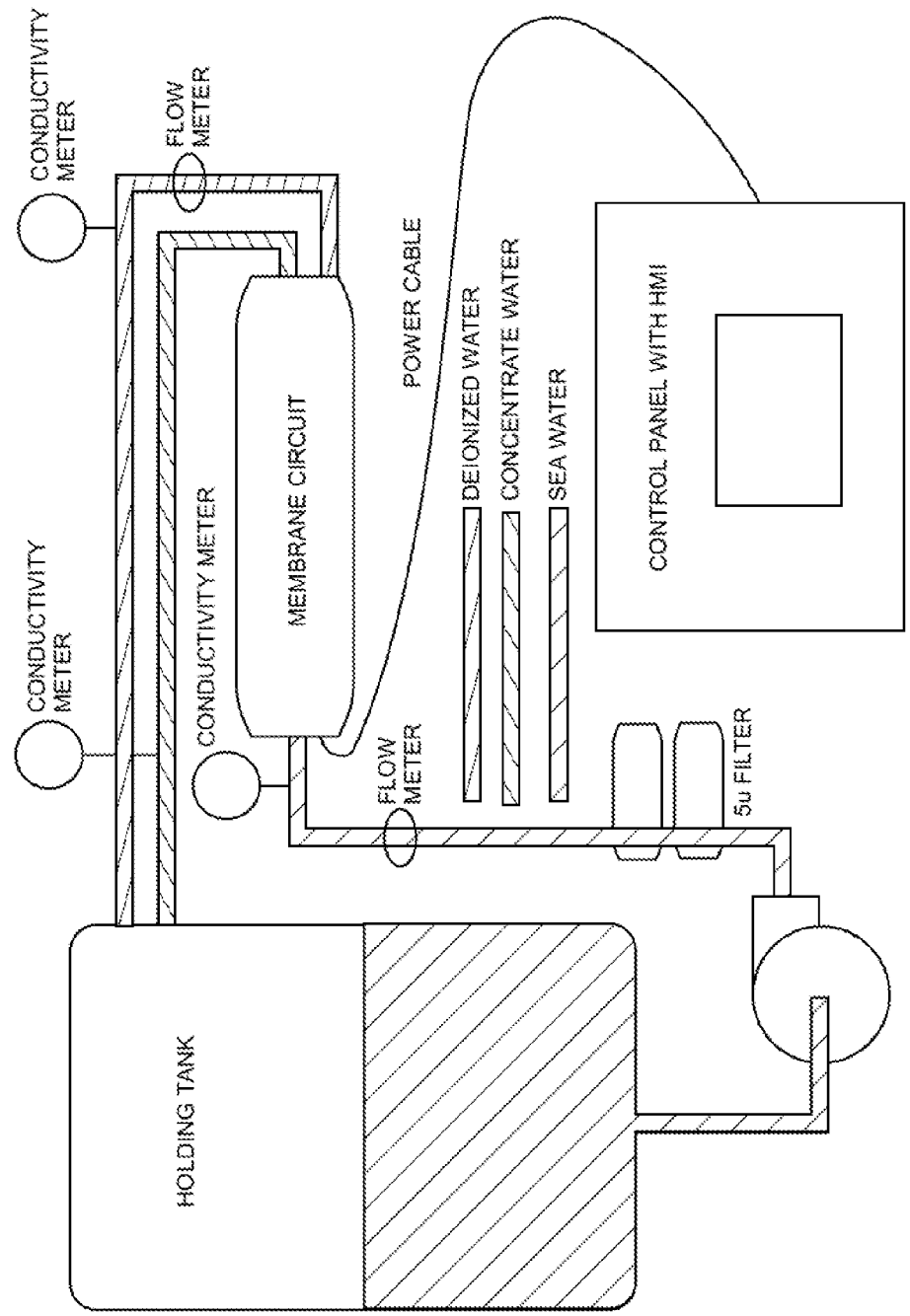
FIG. 2 is a schematic representation of a water desalination treatment system.

FIG. 2 is a schematic representation of a water desalination treatment system. A holding tank would hold a quantity of water, to be desalinated. It would be pumped, such as seawater, to a membrane circuit which would remove ions as described below so as to output a stream of deionized water and a stream of concentrate water that had a majority of the ions from the seawater therein. These two streams would be output to separate compartments of the holding tank or to separate holding tanks.

Figure 3:
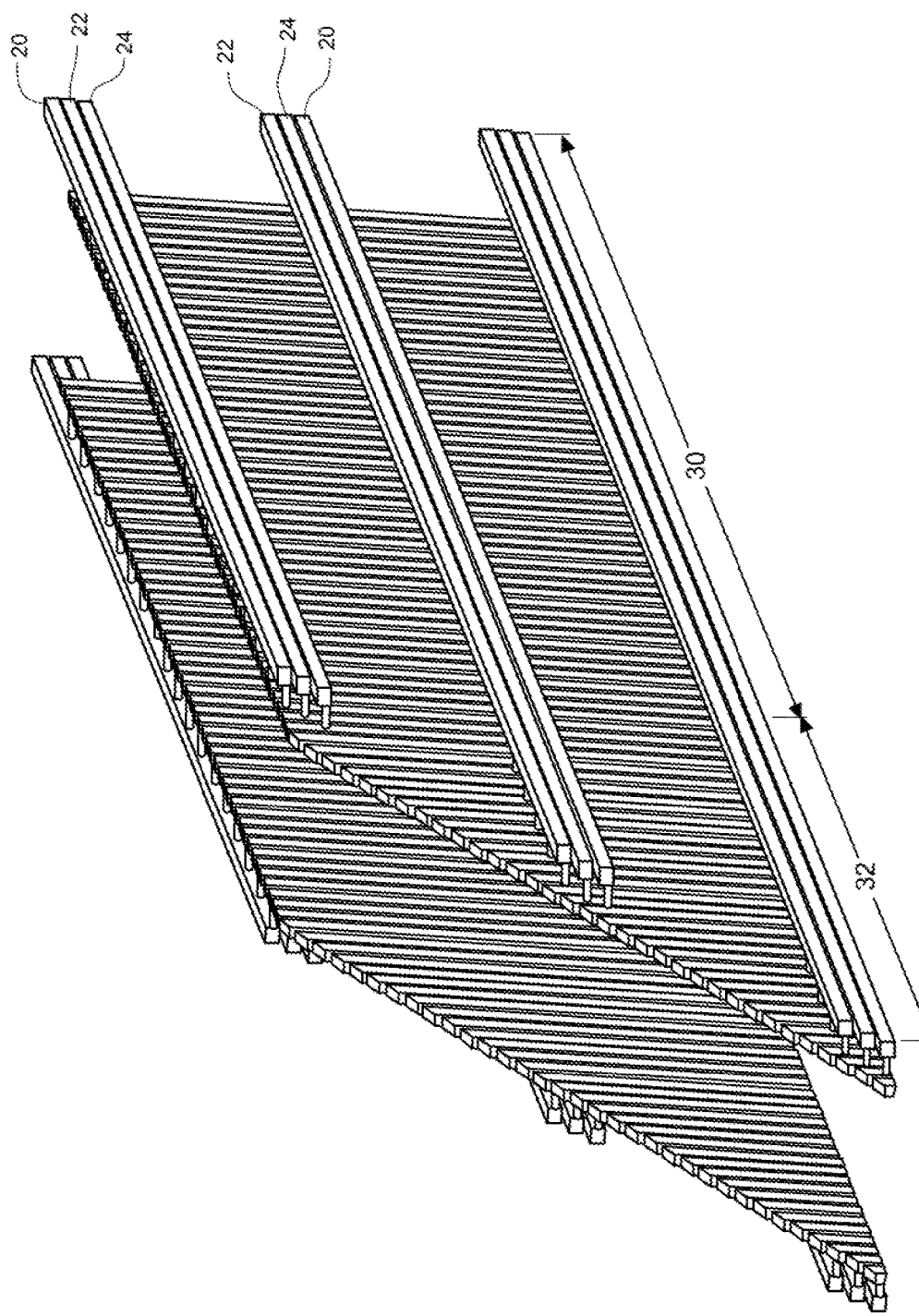
FIG. 3 is a representation of two flexible circuits used in the desalination treatment system.

As previously mentioned, the charged electrodes produce an electromagnetic attraction of the ions towards the respective charged electrode. FIG. 3 is a representation of two flexible circuits used in the desalination treatment system. The two flexible circuits are spaced apart from one another to create a channel through which the water to be desalinated will flow. The two flexible circuits may be spaced apart by a distance ranging from about 5 mils (or about 0.005 inches) to about 100 mils (or about 0.1 inches) and preferably about 10 mils. Each flexible circuit has a plurality of rails sequentially arranged that may be charged in a pattern to being described hereinafter. More particularly, every third rail is electrically coupled together and operatively coupled to a power source so that they can be charged at the same time. As shown in FIG. 3, three buses 20, 22, 24 are used to electrically couple the rails to a power source (not shown) in groups of three. As will be described in detail hereinafter, power is supplied to each bus sequentially so that every third rail is charged at a time.

The rate at which the sequential actuation occurs is preferably faster than the flow of water. For example, it may range from about 20 Hz to about 20 kHz. The optional frequency will be dependent upon the concentration of volts, the velocity of water flowing through the system, and the gap between the layers.

Figure 4:
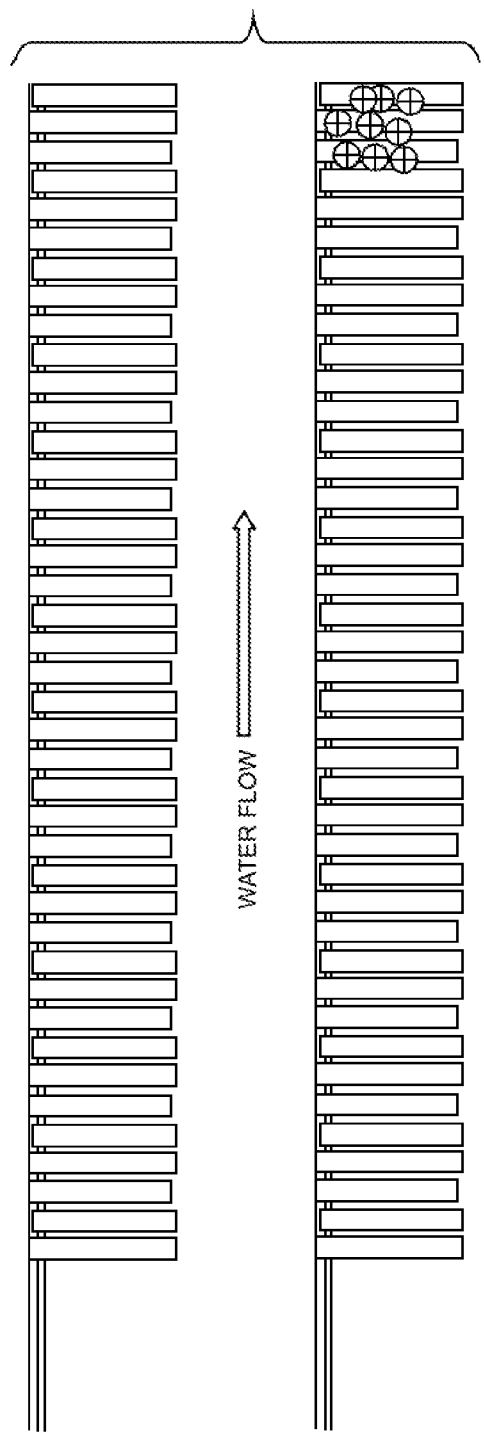
FIG. 4 is a schematic of an ion depletion zone of the flexible circuit shown in FIG. 3.
Figure 6:
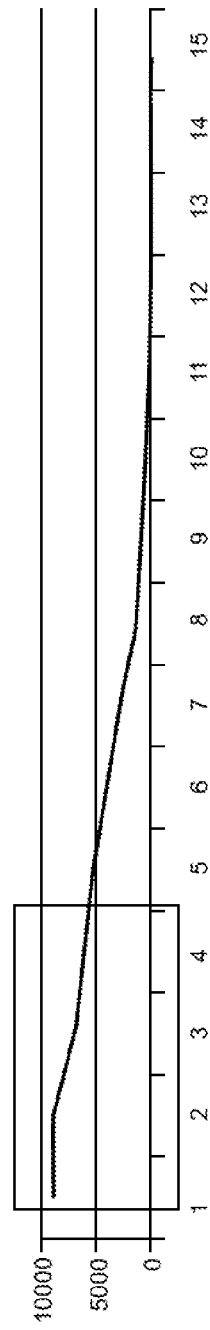
FIG. 6 is a graph of the ion concentration along the ion depletion zone shown in FIG. 4.

The sequential actuation creates an engine that draws the respective ions along the channel faster than the flow of water for a given starting point. As previously mentioned, the channel is divided into the ion depletion zone and the ion removal zone. In particular, section 30 is the ion depletion zone and section 32 is the ion removal zone. FIG. 4 is a schematic of an ion depletion zone of the flexible circuit shown in FIG. 3. As the fluid stream passes the charged electrodes, the concentration of ions is reduced as one progress along the channel as illustrated in the graph of FIG. 6. Towards the very end of the channel, deionized fluid can be collected as will be discussed below that is substantially reduced of ions.

The charges on the rails are synchronized so that every third rail is charged at the same time for a prescribed amount of time. Then, those rails are turned off and the adjacent three rails are charged for the same prescribed amount of time and the pattern continues down the channel and repeats itself over and over. The effect of the sequentially charging the rails is that a linear engine is created that forces the ions to move along the channel faster than the flow of water. As seen in FIGS. 7-9 which illustrate only one of the pair of rails, in this case the one charged with a negative potential so that positive ions are drawn to the charged rail, when the first set of rails are charged, they draw their respective ions towards them then, when they are turned off and the adjacent electrode is turned on, as shown in FIG. 8, the ions are advanced, and when those electrodes are turned off and the adjacent electrodes are turned on as seen in FIG. 9 it continues to draw the ions along the channel. The speed at which the electrodes are turned on and off is faster than the water flow so that the ions proceed along the channel faster than the water flow so that they collect towards the end of the channel. As previously mentioned, this zone of the apparatus is called the ion depletion zone because the concentration of ions decreases along the length of this zone as shown in FIG. 6.

Connected to the ion depletion zone is the ion removal zone as shown in FIG. 5. In the ion removal zone, the channel is tapered to increase the velocity of the water flow through this section as it exits the channel. In the ion removal zone, the rails are still tied to the three buses as they are in the ion depletion zone. Preferably, the ion removal section is formed in two parts, a first section 40 and a second section 42. In operation, the frequency at which the rails are sequentially charged in section 1 may be greater than the frequency used in the ion depletion zone but it does not have to be and the frequency at which the rails are sequentially charged in section 2 may be greater than the frequency of section 1. To avoid a blockage created by the accumulated ions in the ion removal section, at first the rails in the first section 40 of the ion removal zone are turned off so that the charge on those rails disappears and the ions in the first section can float back into the stream of fluid. Because of the flow of fluid from the ion depletion zone, however, the ions that floats back into the fluid in the first section 40 of the ion removal zone do not float back into the ion depletion zone. Alternatively, no section in the ion removal section needs to be turned off.

The deionized fluid is removed at the end of the ion depletion zone before the ion removal section as illustrated in FIG. 5.

The flexible circuit may be incorporated into various shapes. It may be a linear section as shown in FIGS. 3-9 or it may be wound into a spiral shape and housed within a cylindrical housing.

FIG. 10 is a representation of a desalination member formed in a cylindrical shape. The salinated water enters the cylinder through a water input and travels along a flex circuit to be described in detail below so that purified water is output at a purified output and waste water in output at waste water outputs. The outputs are shown conceptually.

Figures 11, 12, 13:
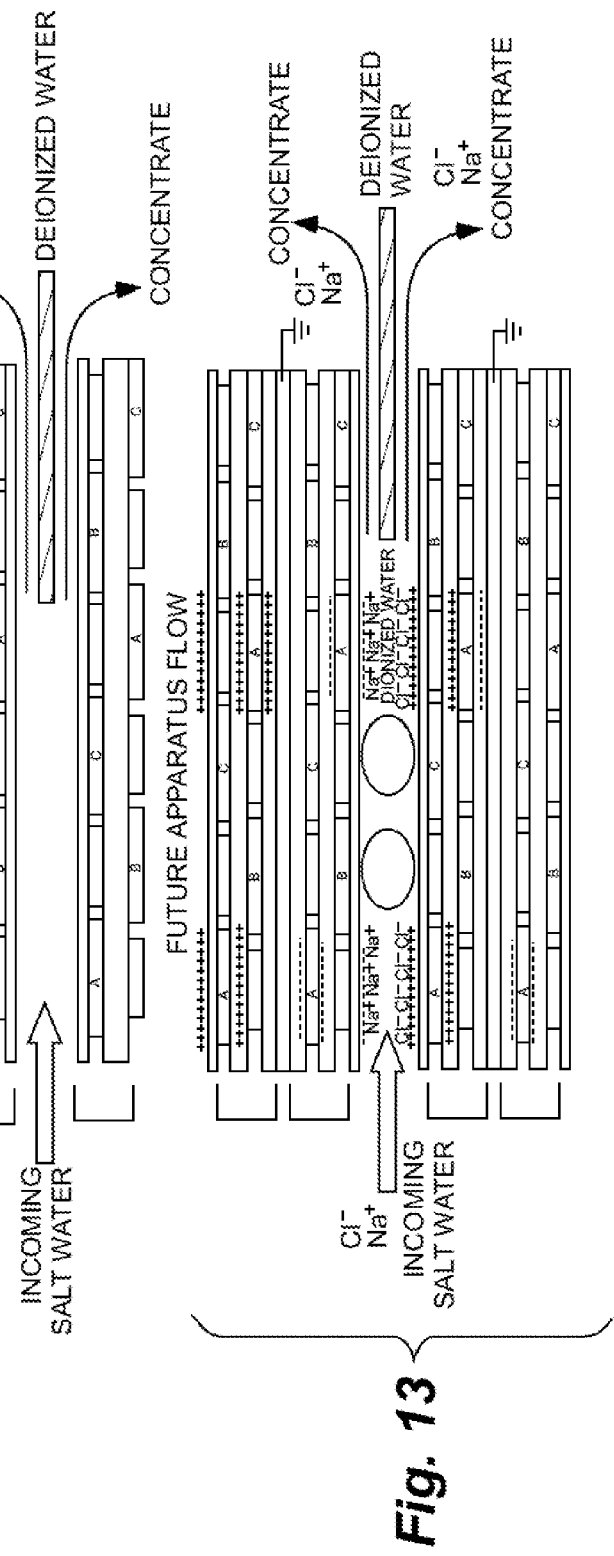
FIG. 11 is a schematic of a portion of a flex circuit according to a first embodiment of the invention.
FIG. 12 is a schematic of a portion of a flex circuit according to another embodiment of the invention.
FIG. 13 is a schematic of a portion of a flex circuit according to another embodiment of the invention.

FIG. 11 is a schematic of a portion of a flex circuit according to a first embodiment of the invention. The charged rails are separated from one another by a small gap "g." When the charged rails are on the same level as they are in this embodiment, they cannot be completely adjacent to one another because of shorts. This cause the ions to have to jump from rail to rail over the e gap. The main disadvantage of having the gap is that the ions have a non-continuous static charge to follow. The electric force the ions feel is proportioned to the square of the distance. The smaller the gap, the stronger the force, but the more likelihood of an electrical short.

FIG. 12 is a schematic of a portion of a flex circuit according to another embodiment of the invention. In this embodiment, the adjacent rails are not on the same level; rather they are separated by a flexible circuit board. Because of that the small gaps are removed and there is a continuousness to the charged rails. This has the advantage that there is a continuous static charge for the ions to follow. Electric shorts are prevented by the dielectric material of the flexible circuit.

FIG. 13 is a schematic of a portion of a flex circuit according to another embodiment of the invention. In this embodiment there are multiple levels of charged rails separated by flexible circuit boards. This embodiment is particularly useful for a cylindrical configuration as spacers are provided as the circuit boards are rolled to allow channels through which the water can flow.

Figure 14:
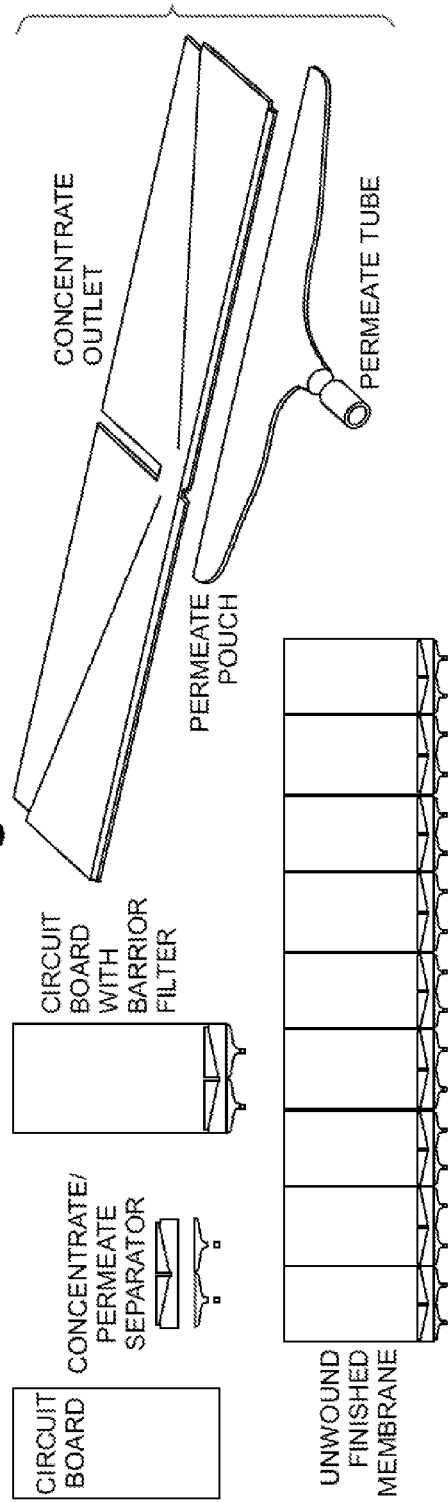
FIG. 14 is a deconstructed desalination unit meant to be used in a cylindrical configuration.

FIG. 14 is a deconstructed desalination unit meant to be used in a cylindrical configuration. A plurality of circuits are formed adjacent to one another and for each circuit board there are two permeate pouches to collect the waste water and a concentrate outlet to capture the desalinated water.

Figure 15:
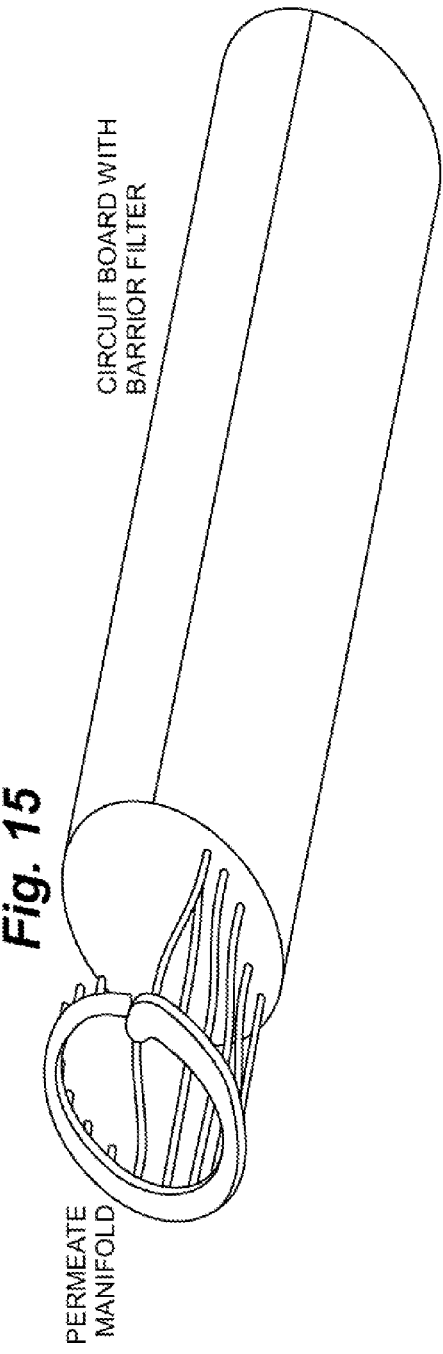
FIG. 15 is the unit shown in FIG. 14 configured in a cylindrical configuration and coupled to a manifold.

FIG. 15 is the unit shown in FIG. 14 configured in a cylindrical configuration and coupled to a manifold. The manifold collects the waste water from the cylindrical desalination unit.

The embodiments of the present invention provide several benefits over currently available desalination techniques. First, unlike reverse osmosis techniques, no permeable membranes are required. These membranes require high pressure and hence high energy and costs to reduce salt concentration. Additionally, they are highly susceptible to oxidation and will degrade rapidly if exposed to chlorine or any other oxidation agent. Because of this, bacteria is always a concern. Our system uses electrostatic forces to remove the salts from the water. The amount of power required to generate these electrostatic forces is far lower than what it takes to pressurize a reverse osmosis system. We estimate that greater than 95% reduction of power will result. Additionally, because our design is not susceptible to oxidation, we have the added benefit of using chlorine or other oxidation agents to limit bacteria growth and contamination.

Other embodiments of the claimed invention will be apparent to those skilled in the art from consideration of the specification and practice of the inventions disclosed herein. It is intended that the specification and examples be considered as exemplary only, with a true scope and spirit of the inventions being indicated by the following claims.

What is claimed is:

1. A method of desalinating water comprising:
   providing a channel through which water can flow, the channel having a length and a width, the channel formed by a series of opposed rails wherein the series of opposed rails determines the length of the channel and the distance between opposed rails determines the width of the channel;
   electrically coupling non-adjacent rails along the length of the channel in a pattern;
   providing a nonconductive, impermeable barrier over the series of opposed rails along a surface facing an interior of the channel;
   flowing ionized water through the channel;
   sequentially energizing electrically coupled pairs of opposed rails from the series of opposed rails to create a potential voltage therebetween, the energized rails forming charge collection surfaces that attract ions towards them when ionized water flows through the channel;
   removing a stream of concentrate water containing a majority of ions; and
   collecting deionized water.

2. The method of claim 1 wherein the potential voltage is 300 volts.

3. The method of claim 1 wherein the pattern is every third rail is electrically coupled together.

4. The method of claim 1 wherein the step of sequentially energizing occurs at a rate of about 20 Hz to 20 KHz.

5. The method of claim 1 wherein each one of a pair of opposed rails to energized to 150 volts.

6. The method of claim 1 wherein the length of the channel is divided into an ion depletion zone and an ion removal zone wherein in the ion depletion zone the concentration of ions is reduced as the water flows along the ion depletion zone.

7. The method of claim 1 wherein the step of sequentially energizing the electrically coupled pairs of opposed rails creates an engine that moves ions along the channel faster than the flow of water.

8. The method of claim 6 wherein the ion removal zone is tapered to increase the velocity of the water flow through that zone.

9. An apparatus for desalinating water comprising:
   a channel having a length and a width, the channel formed by a series of opposed rails wherein the series of opposed rails determines the length of the channel and the distance between opposed rails determines the width of the channel;
   a plurality of electrical busses coupled to the series of opposed rails wherein each bus couples non-adjacent rails along the length of the channel in a pattern;
   a nonconductive, impermeable barrier over the series of opposed rails along a surface facing an interior of the channel;
   a processor programmed to sequentially energizing electrically coupled pairs of opposed rails from the series of opposed rails to create a potential voltage there between, the energized rails forming charge collection surfaces that attract ions towards them when water flows through the channel.

10. The apparatus of claim 9 wherein the potential voltage is 200 volts.

11. The apparatus of claim 9 wherein the pattern is every third rail is electrically coupled together.

12. The apparatus of claim 9 wherein the processor is programmed to sequentially energize the electrically coupled pairs of opposed rails at a rate of about 20 Hz to 20 KHz.

13. The apparatus of claim 9 wherein each one of a pair of opposed rails is energized to 150 volts.

14. The apparatus of claim 9 wherein the channel comprises an ion depletion zone and an ion removal zone wherein the ion depletion zone the concentration of ions is reduced as the water flows along the ion depletion zone.

15. The apparatus of claim 14 wherein the ion removal zone is tapered to increase the velocity of the water that flows through that zone.

* * * * *